United States Patent Office 3,452,537
Patented July 1, 1969

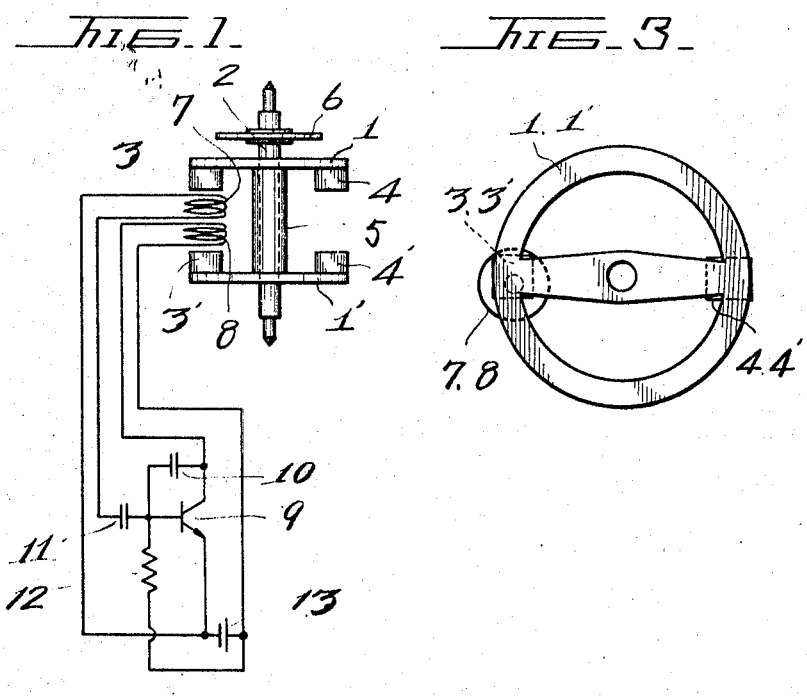
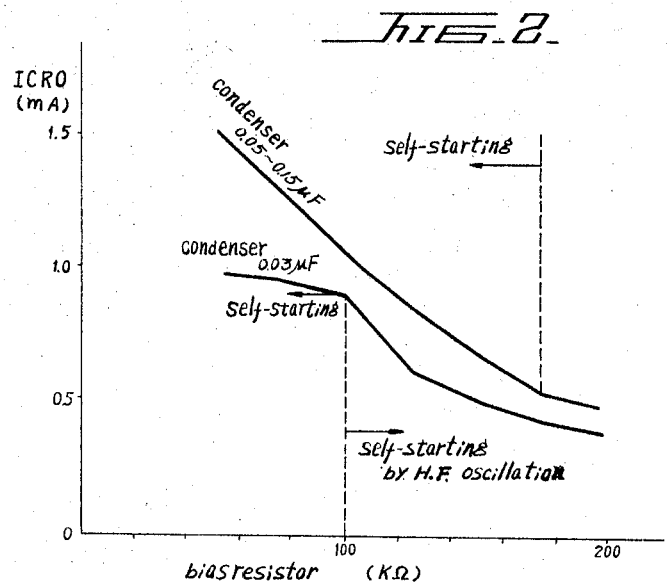

3,452,537
SELF-STARTING AND DRIVE MEANS FOR A TIMEKEEPING DEVICE
Shigeru Sasaki, Murata-machi, Shibata-gun, Japan, assignor to Tokyo Tokei Seizo Kabushiki Kaisha, Kanagawa-ken, Japan
Filed Aug. 8, 1967, Ser. No. 659,170
Claims priority, application Japan, Dec. 19, 1966, 41/82,776
Int. Cl. G04c 3/04
U.S. Cl. 58—28                                2 Claims

ABSTRACT OF THE DISCLOSURE

This invention relates to a new arrangement for automatically starting the balance wheel and drive in a timekeeping device employing a transistor circuit and its purpose is to eliminate temperature influence and to require only a small current for starting. The balance wheel carries one or more permanent magnet means relative to a separate drive coil and a pickup coil arrangement electrically for coupling to the magnetic means. The path of the magnetic means relative to the coils is slightly offset to the center of the coils. A transistor is provided for coupling between an electric drive source and the coils. One circuit connects the drive coil to the electric source by way of the emitter and collector of the transistor. Another circuit connects the pickup coil to the electric source by the emitter and base of the transistor. A condenser and a biasing resistor are connected between the two circuits of the drive and pickup coils and the circuit is characterized by the selection of values by the condenser and resistor which will preclude oscillation.

---

This invention relates to a drive device, which can start by itself in a transistor time-keeping device, in which the balance is used as the regulating organ, the oscillating motion of the balance is converted to the one directional rotary motion, and this rotary motion is led to the time indicating mechanism through a reduction gear train.

It has been known in this type of time-keeping device to make the permanent magnet fastened on the balance wheel co-operate with the electric circuit including transistors for drive control. But by connecting the above mentioned circuit with an electric source only, the balance wheel cannot start, so hitherto the balance has been started by external mechanical impulses.

Also, it is already known that the balance can be started by making the drive circuit which contains transistors oscillate when it is connected with the electric source, but this system, with a battery as its source, has a great defect in that it consumes a very large current at starting.

The object of this invention is to provide a new device which can start the balance and drive automatically in the time-keeping device with a transistor circuit, eliminating the temperature influence at starting and with a very small current consumption.

The other objects and advantages of this invention will be clear in the following explanation referring to the drawings annexed.

FIGURE 1 is a view in side elevation of a balance wheel and associated components, as well as an electrical start and drive circuit of the invention, FIGURE 2 is a graph showing a range where the self-starting of the balance of this invention is effective, and FIGURE 3 is a plan view of the balance wheel of FIGURE 1, showing co-relating positions of permanent magnets fastened on the balance wheel and of the pickup coil and drive coil which co-operate with said magnet.

In the preferred embodiment of the present invention illustrated in FIGURE 1, there is shown a balance of a time-keeping device comprising elements 1, 1', 2, 3, 3', 4, 4', 5, and 6. Balance wheels 1 and 1' are made of a magnetic material and are fixed on an arbor 2. A pair of similar permanent magnets 3 and 3' are located coaxially of each other on the balance wheels and they face one another. The balance weights 4 and 4' are located on the balance wheels in facing relation at positions diametrically opposite the permanent magnets 3 and 3', respectively. A pipe 5 made of a magnetic material is fitted over the arbor 2 and held between the two balance wheels, to form the magnetic circuit of the magnets 3 and 3'. A hair spring 6 is used to give the balance a return rotary motion as in conventional time pieces. Coils 7 and 8 are coaxially arranged and electrically co-operate with the magnets 3 and 3', coil 7 being a signal pickup coil and coil 8 being a balance drive coil. The electrical circuit includes a silicon transistor 9, condensers 10 and 11, a bias resistor 12, an electric source shown as battery 13. As shown in FIGURE 3, the relative positions of magnets 3 and 3' and the coils 7 and 8 are so arranged that the centers common axis of said coils are shifted or offset a little from the centers or common axis of said magnets on the circumference of the balance wheel when the balance is at rest, that is, the electric source circuit being open (e.g., battery out), but the allowance of offset or deviation of center positions is within one half of magnet size, that is within one-half the dimensions of the magnets transverse to their common axis.

This discharged voltage becomes an input signal for the transistor 9, and the amplified signal by amplification of the transistor will appear as an output in the drive coil 8. By this output, the motion of the balance wheels 1 and 1' will be further strengthened into large rotary motion and returned by the action of the hair spring 6. In the repetition of this rotary reciprocating motion, the amplitude of the balance will reach to a certain magnitude and will stabilize at that amplitude.

When letting the balance wheels stop by an external force and thereafter taking off that force and connecting the electric source 13 with the circuit, the operation will be as follows:

Due to the function of the bias resistor 12 and condenser 10 the current flows through the transistor 9 into the drive coil 8. Accordingly, in said coil 8 there occurs a magnetic field. This magnetic field gives the permanent magnets 3 and 3' fastened on the balance wheels 1 and 1' repulsion or attraction, so they are moved a little and co-operating with the returning action of the hair spring 6 will start, and along the above described procedure the amplitude of the balance will remain constant after having reached a certain magnitude and will stabilize.

Referring to FIGURE 2, it can be seen that if a silicon transistor (static forward current transfer ratio: $hfe=120$–$180$), a pickup coil and a drive coil of each 2,000 turns of polyurethane coated wire $0.05\Phi$ (mm.) are used, the magnetic flux density of the magnets 3 and 3' being 600 gauss respectively, the balance can move automatically if the value of the condenser 10 is in the range $0.04$ $\mu f.$–$0.15$ $\mu f.$, however if the valve of the bias resistor 12 is over 175KΩ, the balance cannot start by itself, because the magnetomotive force is too weak. And if the value of the condenser 10 is under $0.03\mu f.$, and if the value of the bias resistor 12 is under 100KΩ, the balance will start without oscillation. However if the value of the bias resistor 12 is over 100KΩ, the balance will start by oscillation. However, in this case it is well known in the transistor circuit theory that it is apt to be unstable under many kinds of temperature conditions. Namely, it is evident that the oscillation is influenced by the temperature. Under the proper condition that the relation between the magnetic flux density of the magnets 3 and 3' and the number of turns of the signal pickup coil 7 and the drive coil 8 is constant, if the values of the bias resistor 12 and the condenser 10 are selected in a certain range, due to action of condenser 10, the coupling of the signal pickup coil 7 and the drive coil 8 becomes close and consequently the magnetic force is increased and the feedback value of the picked up signal increases also.

This feedback signal becomes the input signal of the transistor 9 and due to this, the magnetomotive force is generated in the drive coil 8. Consequently, the balance can start by itself wtihout oscillation. According to the selection of the value of the bias resistor 12, one can determine the current consumption in the operation of the balance and at starting.

If the values are selected in the range of an embodiment illustrated in FIGURE 2, such a very little amperage current as for example 600 μa. at starting, 100 μa. during operation make the balance start and drive. Although the experimental data illustrated in FIGURE 2 is obtained from clocks, it is evident that less consumption current can be obtained from watches.

As above described, according to this invention by the proper selection of the value of the magnetic flux density of the permanent magnet, and that of the pickup coil 7 and the drive coil 8, and by the selection of such values of the condenser 10 and the bias resistor 12 so that no oscillation occurs, thereby eliminating the influence of temperature, this circuit can start automatically and drive the balance.

This invention is not to be confined to any strict conformity to the showings in the drawings but changes or modifications may be made therein.

What is claimed is:

1. In a time-keeping device, a self-starting and drive arrangement comprising, in combination a balance wheel means; permanent magnet means comprising a pair of permanent magnets carried coaxially by the balance wheel means; a drive coil and a pickup coil coaxially arranged with respect to each other to electrically cooperate with the magnetic means; the relative positions of said magnets and coils when they are at rest with respect to one another being such that the common axis of said coils is offset within one-half the dimension of the magnets transverse to their common axis; a transistor having a collector, an emitter and a base; an electric drive source; a first circuit comprising the emitter and base of said transistor; said pickup coil being connected via the first circuit to said electric drive source; a second circuit comprising the emitter and collector of said transistor; said drive coil being connected via the second circuit to the electric drive source; and condenser means and biasing means connected between said circuits.

2. In a time-keeping device, a self-starting and drive arrangement comprising in combination a balance wheel means; permanent magnet means comprising a pair of permanent magnets carried coaxially by the balance wheel means; a drive coil and a pickup coil electrically to cooperate with the magentic means; the relative positions of said magnets and coils when they are at rest with respect to one another being such that the common axis of said coils is offset within one-half the dimension of the magnets transverse to their common axis; a transistor having a collector, an emitter and a base, an electric drive source; means connecting the drive coil to the electric source by way of the emitter and collector of said transistor; means connecting said pickup coil to the electric source via the emitter and base of said transistor; a condenser and a bias resistor connected between the means connecting the drive coil and the means connecting the pickup coil; and said arrangement being characterized by the selection of values such that the value of said condenser is less than 0.15 μf. and the value of said resistor is less than 175KΩ to preclude oscillation in relation to the magnetic flux of said magnetic means.

References Cited

FOREIGN PATENTS 1,392,320    2/1965    France.
1,404,942    5/1965    France.

RICHARD B. WILKINSON, *Primary Examiner.*

E. C. SIMMONS, *Assistant Examiner.*

U.S. Cl. X.R.

58—23